Nov. 18, 1952 C. H. DAVENPORT ET AL 2,618,547
MANUFACTURE OF MIXED FERTILIZERS
Filed Jan. 25, 1950
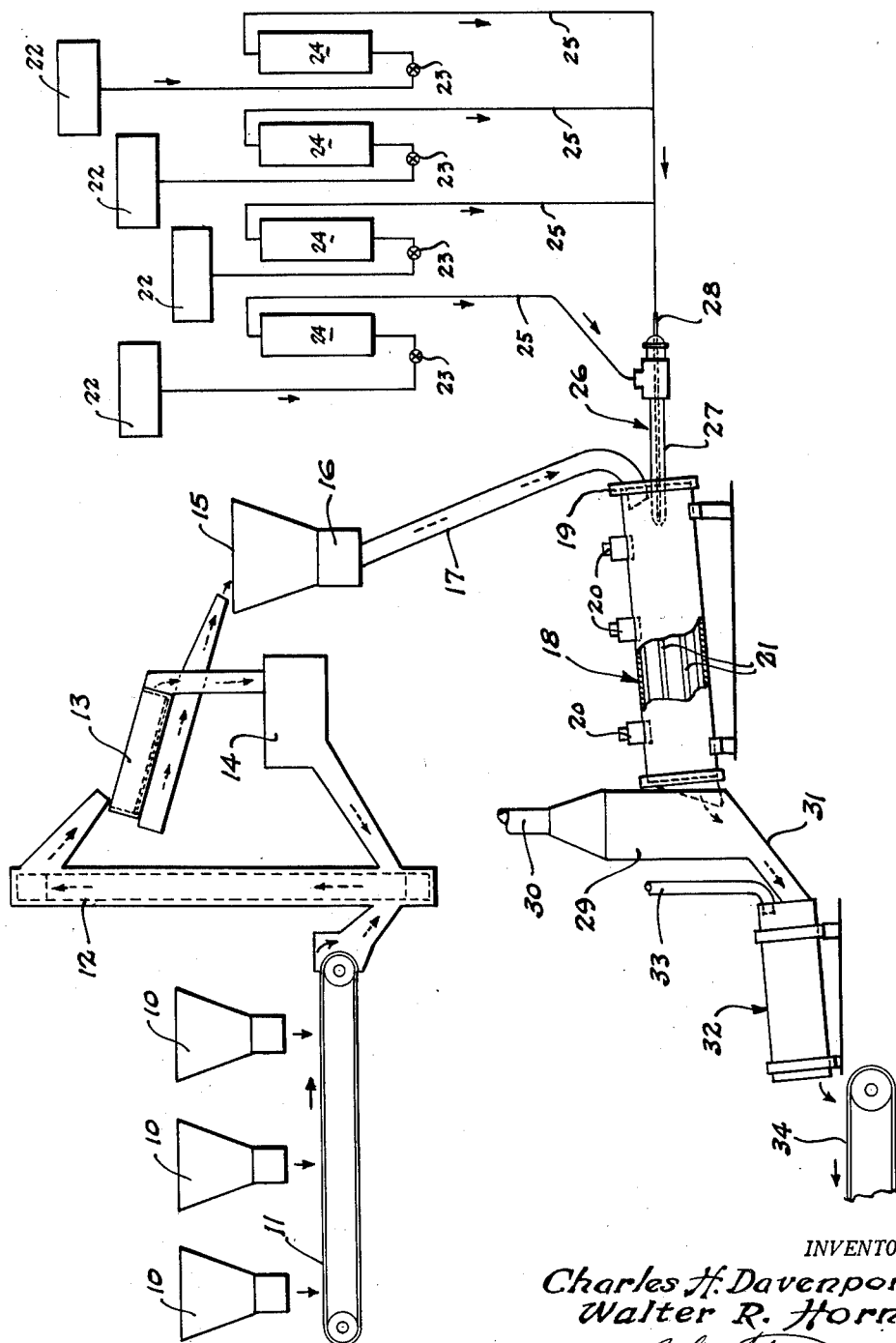
INVENTOR.
Charles H. Davenport
Walter R. Horr
BY
ATTORNEY Patented Nov. 18, 1952

2,618,547

UNITED STATES PATENT OFFICE 2,618,547

MANUFACTURE OF MIXED FERTILIZERS

Charles H. Davenport, El Dorado, Ark., and Walter R. Horn, Agricola, Fla., assignors to Swift & Company, Chicago, Ill., a corporation of Illinois Application January 25, 1950, Serial No. 140,504

6 Claims. (Cl. 71—43)

The present invention relates to the manufacture of fertilizer and more particularly to the manufacture of a mixed fertilizer by a continuous process.

It has long been the practice to prepare fertilizers by mixing together various ingredients, each of which supplies one or more of the different elements necessary for normal plant metabolism so that a complete plant food is produced which may be added to the soil by a single operation. One method of accomplishing the foregoing has been to admix in suitable apparatus the various ingredients in solid form.

It has also been the practice to form a mixed fertilizer by adding a portion of the ingredients of the same in solid form and another portion in the form of liquid materials, some of which may contain nitrogen and will produce fertilizer solids in situ. This last-mentioned procedure has been found to be particularly advantageous when it is desired to have a nitrogen compound present in the final fertilizer mixture. For example, an ammonia-containing liquid and a mineral acid may readily be brought together to form a salt, which provides an excellent source of nitrogen as a plant food.

Up to the present, however, the manufacture of mixed fertilizers, by a process which employs a portion of the ingredients initially in liquid form, has been carried out largely as a batch process with its attendant disadvantages resulting from the use of expensive, bulky and space-consuming apparatus. Particularly, no continuous process has been devised for the manufacture of mixed fertilizers, using in the formula ammonia-containing liquids and an acid such as sulfuric or phosphoric acid. By the present invention there has been provided a continuous process which is adaptable to the employment of increased amounts of any liquid and in any of the combination of liquids and solids used in the manufacture of fertilizer products.

Accordingly, it is an object of the present invention to provide a continuous process for economically and efficiently incorporating a larger amount of nitrogen from nitrogen-containing liquids in a mixed fertilizer than has heretofore been thought possible.

A further object of the present invention is to provide a continuous process for preparing a mixed fertilizer which has highly desirable physical properties.

A still further object of the present invention is to provide a continuous process for preparing a mixed fertilizer which results in a granular product of optimum particle size.

Another object of the present invention is to provide a process for preparing a mixed fertilizer by means of which excess water is automatically removed from the mixture.

Yet another object of the present invention is to provide a process for preparing a mixed fertilizer in which the various ingredients will be more intimately and homogeneously mixed than has been the case with that prepared by earlier processes.

Still another object of the present invention is to provide a process for preparing a mixed fertilizer which will be less subject to caking than such fertilizers heretofore prepared.

Another object of the present invention is to provide a continuous process for the manufacture of mixed fertilizers which will produce a greater product yield for a given size of equipment than methods heretofore employed.

Still another object of the present invention is to provide a continuous process for the manufacture of mixed fertilizers which is easily controlled to yield a uniform product.

Still another object of the present invention is to provide a continuous process for manufacturing a mixed fertilizer which is accompanied by a minimum loss of valuable materials.

A further object of the present invention is to provide a continuous process which lends itself more readily to automatic controls than does the batch process.

Other and further objects of the invention will be apparent from the following detailed description taken in conjunction with the drawing, which is a diagrammatic view of a form of apparatus which has been found to be highly effective in carrying out the instant continuous process.

The ingredients of the fertilizer mixture to be added in solid form may be, for example, superphosphate, triple superphosphate, muriate of potash, dolomite, or the like. It is to be understood, however, that the nature and amount of these ordinary fertilizer solids are not critical in connection with the present invention.

The ingredients of the fertilizer, initially added in liquid form, may include ammonium hydroxide, anhydrous ammonia, a nitrogen compound solution, and a mineral acid. The nitrogen compound solution may be one of the commercial solutions containing ammonium nitrate, anhydrous ammonia, and water, or a solution of ammonium nitrate.

The proportion of these ingredients may be varied in accordance with commercial practice. The nitrogen compound containing solutions may also consist of a mixture of urea, anhydrous ammonia, and water.

As the acid component, sulfuric acid is preferred, but it is to be understood that other mineral acids which will combine with ammonia in an exothermic reaction may be employed. The sulfuric acid is preferably in the form of a highly concentrated solution, and such a solution of approximately 60° Bé. has been found satisfactory.

When a fertilizer solid, such as superphosphate or triple superphosphate, which is itself quite acid in nature, is employed, it is possible to obtain a satisfactorily mixed fertilizer without the addition of any additional acid, it being necessary merely to add sufficient ammonia-containing material to react with the excess acid present in the fertilizer solids. For fertilizers requiring a higher nitrogen analysis, however, it is preferred to add at least some acid in addition to that present in the solids, but in every case allowance should be made for an excess of free ammonia above that required for complete reaction with the added acid to permit reaction with the acid present in the fertilizer solids.

In carrying out the present invention in an apparatus such as that illustrated by the drawing, the initially solid ingredients of the fertilizer are supplied from ordinary batching hoppers 10, the same being synchronized such that the desired number of batches, correctly weighed, of each individual solid being used will be delivered in a given period of time. The solids are then transferred in partially mixed form by means of a belt conveyor 11, elevator 12, screen 13, and grinder 14 to a surge hopper 15 of conventional design. The particle size of the solids delivered to surge hopper 15 is not particularly critical, but it is preferred at this stage of the process that the particle size of the solids be within the range of minus N.6 to plus N.40 U. S. Standard Sieve Series. From the surge hopper 15 the desired amount of the mixed solids, metered by any suitable conventional means 16, is continuously passed through a conduit 17 to the delivery end of a rotary, tubular mixer 18 through a seal plate 19 closing the end. The mixer 18 is downwardly inclined and may be equipped with suitable knockers 20 and flights or ribs 21 in the conventional manner.

Although the above-outlined procedure is entirely suitable for delivering the solid ingredients to the mixer, it is to be understood that it is possible to meter the solids continuously in the proper proportions to the mixer from a separate feeder for each type of solids employed. However, in either case, the procedure will be entirely automatic.

The initially liquid ingredients will be continuously delivered as desired by a liquid-metering assembly which may be effected by conventional apparatus such as metering pumps or rotameter flow controllers. The sulfuric acid and liquid nitrogen ingredients are supplied from conventional storage tanks 22 which maintain a constant head of liquid with the rate of flow being readily controlled by means of valves 23 and appropriate meters 24. The metered streams of ammonia liquids and acid are conveyed through supply lines 25 to an injection device designated generally by 26, mounted in the end seal plate 19 of the continuous mixer 18. The injection device 26 comprises a manifold portion 27 through the annulus of which the acid is passed, and a concentrically disposed inner conduit 28 through which the ammonia and other nitrogen-containing liquids flow. In the region beyond the end of this latter conduit 28 chemical reaction between the acid and ammonia occurs, evolving considerable heat and giving rise to extensive steam formation. This steam and the products of the reaction are injected into the fertilizer solids continuously, being delivered to the rotating mixer 18. For this purpose the delivery end of the injector 17 is disposed at a sufficient distance within the mixer so that the solids have commenced tumbling in their normal manner as they migrate through the mixer before they come into contact with the spray from the delivery end of the injector.

If the fertilizer solids are themselves of an acid nature, the amount of ammonia-containing liquid added should be such that there will be present, after reaction with the sulfuric acid, an excess of free ammonia capable of reacting with the acid contained in the fertilizer solids. Since the uncombined ammonia in the sprayed liquids passes directly through the tumbling acidic solids, it is completely absorbed before migrating to the delivery end of the mixer, which prevents a loss of this valuable material.

Also, it will be noted that the fertilizer solids are immediately contacted as they enter mixer 18 with moist, highly heated steam as well as with ammonium sulphate slurry and the excess-free ammonia. It has been found that the solids, tumbling in the moist steam atmosphere, undergo a marked tendency toward a cementing action, and this tumbling, accompanied by surface wetting of the individual particles by steam, produces a marked uniform granulation of the product.

The mixed fertilizer so formed is tumbled in the steam atmosphere in its travel through the mixer 18 which, as indicated, may be provided with suitable knockers 20 and flights or ribs 21, and is continuously discharged into a receiver 29 which is provided with conduit 30 at its upper end for the continual venting of steam therefrom. Thus, excess water is automatically removed, resulting in a relatively dry product which exhibits little tendency toward caking.

From the receiver 29 the solids are continuously fed through a discharge outlet 31 into a cooler 32 which may also be of the rotating type and generally similar in its structure to that of mixer 18. Cooling and further drying of the product may conveniently be aided by continuously drawing air through the mixture in a direction counter-current with respect to the flow of solids therethrough, by the employment of a suction duct 33. The mixed fertilizer is continuously withdrawn from the discharge end of the cooler 32 and passed to storage by any suitable conveying means 34.

In carrying out the present invention wherein it is possible to obtain 100 per cent of the nitrogen required from nitrogen-containing liquids, the amount of uncombined ammonia used to react with the sulfuric acid and phosphate in the preferred formula is determined by allowing approximately 0.35 pound ammonia for each pound of 100 per cent sulphuric acid and about 3 pounds ammonia for each 20 pounds of available phosphate used. Sufficient additional nitrogen of a source other than ammonia in the form of nitrogen-containing liquids may be used as required to make the fertilizer product of the desired nitrogen content. In addition to the nitrogen, sulfuric acid, and phosphate preferably in the form of superphosphate or triple superphosphate, it is desirable to include other plant foods in the formula, such as potash, dolomite, and the like.

As specific examples of mixed fertilizers prepared in accordance with the above-outlined procedure, there is set forth the following:

EXAMPLE NO. 1

*Formula: 6-9-6 (6% N, 9% available $P_2O_5$, 6% $K_2O$)*

| Operating formula: | No. |
|---|---|
| 60 Bé. sulfuric acid | 385 |
| Ammonia liquid | 110 |
| Nitrogen compound solution | 75 |
| Superphosphate | 900 |
| Potash | 200 |
| Dolomite | 400 |

Product Characteristics:
- Temperature of product at mixer discharge _____ 185° F.
- Ammonia in exit steam _____ Negligible
- Product screen analysis:
  - Larger than 6 mesh _____ 8.9%
  - 6 to 40 mesh _____ 78.2%
  - Smaller than 40 mesh _____ 12.9%

EXAMPLE NO. 2

*Formula: 6-9-6 (6% N, 9% available $P_2O_5$, 6% $K_2O$)*

| Operating formula: | No. |
|---|---|
| 60 Bé. sulfuric acid | 360 |
| Nitrogen compound solution | 175 |
| Ammonium hydroxide | 75 |
| Anhydrous ammonia | 36 |
| Superphosphate | 900 |
| Potash | 200 |
| Dolomite | 314 |

Product Characteristics:
- Temperature of product at mixer discharge _____ 190° F.
- Ammonia in exit steam _____ Negligible
- Product screen analysis:
  - Larger than 6 mesh _____ 34.0%
  - 6 to 40 mesh _____ 58.8%
  - Smaller than 40 mesh _____ 7.2%

EXAMPLE NO. 3

*Formula: 4-12-4 (4% N, 12% available $P_2O_5$, 4% $K_2O$)*

| Operating formula: | No. |
|---|---|
| 60 Bé. sulfuric acid | 160 |
| Nitrogen compound solution | 150 |
| Ammonium hydroxide | 75 |
| Superphosphate | 1200 |
| Potash | 130 |
| Dolomite | 335 |

Product Characteristics:
- Temperature of product at mixer discharge _____ 175° F.
- Ammonia in exit steam _____ None
- Product screen analysis:
  - Larger than 6 mesh _____ 17.5%
  - 6 to 40 mesh _____ 79.0%
  - Smaller than 40 mesh _____ 3.5%

There has been provided by the instant invention a continuous process whereby a mixed fertilizer having the desired nitrogen content may be readily and quickly prepared so as to have highly desirable physical properties. Moreover, such a fertilizer may be prepared without loss of ammonia even when all nitrogen is supplied by anhydrous ammonia, and to accomplish this as much as 440 pounds per ton of 60° Bé. sulfuric acid and 150 pounds per ton of anhydrous ammonia have been employed. This may be compared with the present-day practice in which the maximum amount of sulfuric acid and anhydrous ammonia employed in conventional batch mixers is 112 pounds and 40 pounds, respectively, and even with the lower amounts of acid and ammonia used in batch mixers considerable ammonia loss occurs.

Obviously, many modifications and variations of the invention, as hereinbefore set forth, may be made without departing from the spirit and scope thereof.

We claim:

1. A continuous process for the manufacture of a mixed fertilizer which comprises: continuously charging acid-reacting fertilizer solids into one end of an elongated mixing and tumbling zone; continuously injecting into said tumbling fertilizer solids in said zone adjacent the charging end thereof a mixture of highly heated steam, ammonium salt and free ammonia comprising the reaction products from the neutralization of mineral acid with a nitrogen-containing solution having dissolved therein free ammonia in excess of the amount required to fully neutralize the mineral acid; continuously advancing said fertilizer solids through said mixing zone away from said charging end until the excess ammonia has reacted substantially completely with the acid-reacting constituents of said fertilizer solids; then, after said reaction is complete and during the continued movement of the fertilizer solids towards the discharge end of said zone, continuously venting said steam from said mixing zone at a point adjacent the discharge end thereof; and finally continuously discharging a substantially uniform, granulated and relatively dry product from said zone.

2. A process as in claim 1, wherein the mineral acid is sulphuric acid.

3. A process as in claim 1, wherein the mineral acid is phosphoric acid.

4. In a continuous process for the manufacture of a mixed fertilizer wherein continuously tumbling, acid-reacting fertilizer solids are treated in an elongated mixing and tumbling zone with a mixture including free ammonia, said mixture being injected into said solids adjacent the charging end of said zone, the steps which comprise: continuously advancing said fertilizer solids through said zone in an atmosphere of highly heated steam away from the point of injection of said ammonia-containing mixture until the free ammonia has reacted substantially completely with the acid-reacting constituents of said fertilizer solids; and then, after said reaction is completed and during the continued movement of the fertilizer solids towards the discharge end of said zone, continuously venting said steam from said zone at a point adjacent the discharge end thereof to produce a uniform, granulated and relatively dry product.

5. A process as in claim 4, wherein the mineral acid is sulphuric acid.

6. A process as in claim 4, wherein the mineral acid is phosphoric acid.

CHARLES H. DAVENPORT.
WALTER R. HORN.

REFERENCES CITED

The following references are of record in the file of this patent:

UNITED STATES PATENTS

| Number | Name | Date |
|---|---|---|
| 1,980,008 | Shoeld | Nov. 6, 1934 |
| 2,047,393 | Siems | July 14, 1936 |
| 2,077,171 | Harvey et al. | Apr. 13, 1937 |
| 2,504,545 | Waring et al. | Apr. 18, 1950 |

FOREIGN PATENTS

| Number | Country | Date |
|---|---|---|
| 349,066 | Great Britain | May 14, 1931 |